Patented June 29, 1954

2,682,492

UNITED STATES PATENT OFFICE 2,682,492

METHOD OF MAKING BRUCELLOSIS VACCINE

Irvin Forest Huddleson, East Lansing, Mich., assignor to Research Corporation, New York, N. Y., a corporation of New York No Drawing. Application January 16, 1951, Serial No. 206,317

1 Claim. (Cl. 167—78)

1

This invention relates to an improved brucellosis vaccine and to a method of preparing the same.

Brucellosis is a disease which affects both man and animals, particularly cattle, the form of the disease affecting cattle being commonly known as Bang's disease. The disease in its various forms is caused by small rod-shaped bacteria of the genus Brucella, specifically *Brucella abortus*, *Brucella suis* and *Brucella melitensis*.

I have found that a safe and highly effective vaccine for the immunizing of cattle against brucellosis can be made by growing the mucoid growth phases of bacteria of the genus Brucella under conditions effective to increase the catalase content of the bacterial cells to an amount considerably greater than their natural catalase content.

I have found that by growing the mucoid phases of Brucella organisms in an aerated liquid medium in the presence of small amounts of ammonium sulfide the catalase content of the cells can be increased to from five to ten times the normal catalase content of the mucoid growth phase and that suspensions of such cells provide a safe and highly effective vaccine against brucellosis.

The mucoid growth phases of the genus Brucella are mutations obtained by growing normal growth phase cells in a liquid culture medium. Pure cultures of the various distinguishable mucoid growth phases may be obtained by the common bacteriological technique of repeatedly inoculating solid culture media, such as agar slant, with portions of selected colonies. After isolation in this way the mucoid growth phases may be grown and maintained as streak cultures on Petri plates of tryptose agar. When a lot of vaccine is to be prepared, colonies are picked from the streak plates of agar and planted on large agar slants of liver agar. These are incubated at 37° C. for 48 hours.

The mucoid growths are distinguished from the normal and rough growth phases by the adhesive property of the mucoid growths when disturbed by a wire pointer and by their opaque appearance. The two mucoid types of *Brucella suis* which are preferably used in the preparation of the vaccine may be distinguished from each other (1) on the basis of colonial differences when observed under a low power binocular microscope by oblique reflected light and (2) by differences in time of appearance of daughter colonies within the mother colony. These two mucoid growth phases may be distinguished from other

2 mucoid phases by the fact that they dissociate after four days of incubation at 37° C., or six to eleven days at 25° C., into a pseudo smooth phase.

In preparing the cells of high catalase content for the vaccine of the invention a liquid culture medium of the following composition is believed to be the most suitable.

| | | |
|---|---|---|
| Tryptose peptone | grams | 30 |
| (or "M" peptone) | do | 20 |
| Glucose | do | 20 |
| Sodium chloride | do | 5 |
| Thiamin hydrochloride | mg | 5 |
| Distilled water to | ml | 1000 |

The pH is adjusted to 6.7 with 10 per cent phosphoric acid.

Aeration is advantageously effected by passing pure oxygen and nitrogen from cylinders in suitable proportions into the culture medium and the ammonium sulfide may be conveniently supplied by dropping regulated amounts of ammonium sulfide into the gases before they pass into the medium.

The following is an illustrative example of the production of the vaccine of the invention from the two mucoid growth phases of *Brucella suis*.

The medium described above is placed in a 4-liter Pyrex bottle containing a glass tube outlet at the side near the bottom. A piece of rubber tubing connects the glass tube outlet to a vial filling apparatus which is attached before sterilization. The top of the bottle is fitted with a two-hole rubber stopper into each of which is inserted a glass tubing bent in an L shape. Each tube is partly closed with a cotton plug as an air filter.

The bottle of medium is sterilized at 115° C. for 25 minutes and incubated for 2 days at 37° C. to determine sterility. Each bottle of 1,000 ml. of medium is inoculated with the suspended cells of one agar slant of each mucoid growth phase.

At the time of inoculation a sterile solution of ferrous chloride to a final concentration of 0.001 per cent is added to each bottle of medium.

Each bottle of inoculated medium is placed on a shaking apparatus (Krause and Calhoun shaking apparatus) in a 37° C. room. To one of the L tube inlets in the rubber stopper of the bottle is connected a rubber tubing extending to sources of atmospheric gases and ammonium sulfide.

Nitrogen and oxygen are each supplied from a tank of compressed gas.

The flow of each gas to the inoculated bottles of medium is measured and controlled by means of a flow meter. The optimum flow range for oxygen is from 20 and 30 ml. per minute. Flow rates of oxygen greater than 40 ml. per minute reduce the catalase content of the bacterial cells. The flow of nitrogen is regulated at about 50 ml. per minute.

After passing through the flow meters, the gases are passed into a 500 ml. glass bottle for mixing together and mixing with ammonium sulfide. The latter is delivered into the bottle by means of a glass capillary passing through a rubber stopper attached to the bottle. The top outlet of the glass capillary is attached to a 20 ml. glass syringe the plunger of which is slowly pushed downward by means of clock motor by means of a gear mechanism. Reducing gears reduce the speed of the driving gear to 1 R. P. M. per 12 minutes. The syringe is filled with 0.05 per cent solution of saturated ammonium sulfide just before the clock motor is set in motion.

By this means, the mixture of nitrogen and oxygen gases passing into the glass bottle pick up the vaporized ammonium sulfide and all three together flow into the bottle of inoculated culture medium.

The shaker apparatus is now set in motion to produce a slop-rotating motion to the liquid. The speed of the shaker used to produce maximum growth and catalase activity is about 126 shakes per minute. The incubation period for producing maximum catalase activity and growth is from 40 to 48 hours.

At the end of the incubation period a sample of medium containing bacterial cells is removed, diluted with peptone water (0.05 per cent tryptose solution) to a cell content of $2 \times 10^9$ per ml. To 5 ml. of this suspension is added 20 ml. of 1.5 N cold $H_2O_2$ and the mixture shaken for 30 minutes on a shaker apparatus at 25° C. Five ml. of the mixture is withdrawn by means of a volumetric pipette and titrated with N/10 $KMnO_4$ to determine the amount of undecomposed $H_2O_2$. The difference between the amount of $H_2O_2$ added and the amount titrated is the amount of N/10 $H_2O_2$ decomposed per $2 \times 10^9$ cells.

A satisfactory immunizing vaccine should have a catalase activity of at least 100 per $2 \times 10^9$ cells, that is, this number of cells should contain sufficient catalase to decompose 100 ml. of N/10 $H_2O_2$ solution. There should be at least $80 \times 10^9$ mucoid bacterial cells in one dose (1 ml.) of vaccine for cattle.

Brucella cells when grown under the conditions described above and stored immediately at a temperature of 4° C., retain their high catalase activity for at least eleven months.

I claim:

A method of making a vaccine for bovine brucellosis which comprises growing a mucoid growth phase of *Brucella suis* characterized by dissociating into a pseudo smooth phase after four days of incubation at 37° C. in an aerated liquid glucose-containing peptone culture medium containing a small amount of ammonium sulfide until the catalase content of the cells in the culture is sufficient to decompose 100 ml. of N/10 $H_2O_2$ per $2 \times 10^9$ cells.

References Cited in the file of this patent

J. Bacteriology, vol. 46 (1943), page 219.

J. Bacteriology, vol. 41 (1941), pages 70, 71.

Huddleson, Am. Jour. of Vet. Research, vol. VIII, No. 29, Oct. 1947, pages 374–379.

Huddleson, "Brucellosis in Man and Animals," N. Y., 1943, pages 9–13 incl. Fig. 5, 146, 147, 150, 151, 239, 240, 257–260.

Porter, "Bacterial Chemistry & Nutrition" (1946), page 704.

Tauber, "Chemistry & Technology of Enzymes," page 189 (1949).